United States Patent
Hasenbein et al.

(12) 
(10) Patent No.: US 6,245,864 B1
(45) Date of Patent: *Jun. 12, 2001

(54) COPOLYMER OF (A) ETHYLENE AND (B) AND ALKENOIC ACID OR A DERIVATIVE THEREOF A MIXTURE OF SAID MONOMERS

(75) Inventors: Norbert Hasenbein, Dirmstein; Thomas Muehlenbernd, Heidelberg; Gernot Koehler, Worms, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/213,832

(22) Filed: Mar. 16, 1994

Related U.S. Application Data

(60) Continuation of application No. 08/048,961, filed on Apr. 12, 1993, now abandoned, which is a division of application No. 07/448,958, filed on Dec. 12, 1989, now abandoned.

(30) Foreign Application Priority Data

Dec. 28, 1988 (DE) .................................. 38 44 047

(51) Int. Cl.⁷ ................. C08F 2/02; C08F 20/06

(52) U.S. Cl. ............. 526/64; 526/65; 526/317.1; 526/318

(58) Field of Search ........................ 526/64, 65

(56) References Cited

U.S. PATENT DOCUMENTS

| 3,520,861 | 7/1970 | Thomson et al. | |
|---|---|---|---|
| 4,175,169 | * 11/1979 | Beals et al. | 526/64 |
| 4,579,918 | * 4/1986 | Metzger et al. | 526/64 |

FOREIGN PATENT DOCUMENTS

979522 * 1/1965 (GB).

* cited by examiner

Primary Examiner—David W. Wu
Assistant Examiner—Caixia Lu
(74) Attorney, Agent, or Firm—Keil & Weinkauf

(57) ABSTRACT

A copolymer of (a) from 96 to 99.6% molar of ethylene and (b) from 0.4 to 4% molar of a $C_3$–$C_6$-alkenoic acid or an ester thereof having not more than 14 carbon atoms or a mixture of these monomers, which copolymer may be prepared by polymerization in a continuously operated tubular reactor under a pressure of from 500 to 5,000 bar and at elevated temperature in the presence of free-radical initiators by feeding a mixture of the said reactants to the inlet port of the reactor only, restricting the temperature in a first reaction zone to approximately 240° C. and, after the temperature has dropped by from 5° to 20° C., metering further initiator to the beginning of a second reaction zone and completing the reaction at a temperature of up to 300° C.

4 Claims, No Drawings

COPOLYMER OF (A) ETHYLENE AND (B) AND ALKENOIC ACID OR A DERIVATIVE THEREOF A MIXTURE OF SAID MONOMERS

This application is a continuation of application Ser. No. 08/048,961, filed on Apr. 12, 1993, abandoned which is a divisional of 07/448,958, filed on Dec. 12, 1989, abandoned.

The present invention relates to a copolymer of (a) from 96 to 99.6% molar of ethylene and (b) from 0.4 to 4% molar of a $C_3$–$C_6$-alkenoic acid or an ester thereof having not more than 14 carbon atoms or a mixture of these monomers, which copolymer may be prepared by polymerization in a continuously operated tubular reactor under a pressure of from 500 to 5,000 bar and at elevated temperature in the presence of free-radical initiators by feeding a mixture of the said reactants to the inlet of the reactor only, restricting the temperature in a first reaction zone to approximately 240° C. and, after the temperature has dropped by from 5 to 20° C., metering further initiator to the beginning of a second reaction zone and completing the reaction at a temperature of up to 300° C.

Copolymers of ethylene and comonomers containing carboxyl groups have already been described in a number of patent specifications. They are prepared either in stirred autoclaves (U.S. Pat. No. 3,520,861, U.S. Pat. No. 4,351,931) or in tubular reactors (DE-A 3,404,742, DE-A 3,404,743, DE-A 3,404,744 and DE-A 1,952,693) under superatmospheric pressure, in which processes considerable heat of reaction is generated, some of which is absorbed by the reaction mixture while the rest must be removed by suitable cooling means.

In some processes (DE-A 3,404,742, DE-A 3,404,743 and DE-A 3,404,744) the reaction mixtures, which contain additionally to ethylene and comonomer(s) free-radical initiators and possibly regulators to control the molar mass, are fed to the tubular reactor at a number of separate points. By this means comonomer conversion is increased significantly, this being achieved, however, at the expense of an increase in technical requirements. The distribution of gas streams under pressures of from several hundred to some thousand bar is not a simple matter both as regards apparatus and with respect to control measures, especially as the concentration of the comonomers must in some cases be varied depending on the port to which they are fed (DE-A 3,404,742). Many high-pressure compressor units are incapable of parting monomer streams accurately, so that the use of this process must remain restricted to very specialized apparatus.

DE-A 1,952,693 (page 2, paragraph 3) further discloses a method of preparing ethylene copolymers in tubular reactors which involves introducing the feed of initiator at various points of the reactor, keeping it distinct from the ethylene feed, with the proviso that the ethylene feed commences only after an adequate amount of initiator has been introduced. Here again, an increase in the comonomer conversion rate involves a sharp increase in technical requirements due to the necessity to branch the ethylene feed a number of times. DE-A 15,952,693 further describes a process for the preparation of ethylene copolymers in a tubular reactor wherein the total reaction mixture is fed to the entry port of the reactor only, a conversion rate of 20 to 25% being obtainable only by pumping a considerable portion of the reaction mixture back into the reactor. Such recycling, however, again complicates the process as regards equipment and engineering procedure.

If the process is carried out in a less complicated stirred autoclave or individual reactor without splitting the feeds or recycling the reaction mixture, the comonomers are integrated in the resulting product only to a relatively low degree (DE-A 3,404,742, page 2, paragraph 2), which results in poorer mechanical properties.

It is an object of the invention to overcome the said drawbacks and provide a copolymer having an adequate proportion of copolymerized units and showing good properties without resorting to technically complicated measures.

We have thus found the copolymers defined at the commencement of this specification.

The process is carried out in a tubular reactor under a pressure of from 500 to 5,000, preferably from 1,700 to 3,500 bar.

The reaction mixture comprising ethylene, the comonomers and initiator is fed only to the entry port of the reactor, so that splitting of the feeds, as described in U.S. Pat. No. 4,579,918, is not necessary. Conveniently, the reactants are initially heated to a temperature above 50°and preferably above 100° C. with the exclusion of air, so that the reaction starts as the initiator decomposes. Care should be taken to ensure that the temperature does not rise above 240° C. by providing for adequate cooling by means of a liquid flowing round the outer jacket of the tubular reactor. Under these conditions, the comonomers are preferentially integrated in the copolymer with the result that the latter has a higher content of alkenoic acid or ester derivative thereof than the reaction mixture fed to the reactor, this enhancement being due to reactivity differences between ethylene on the one hand and the comonomers on the other, this being more conspicuous the lower the reaction temperature.

An axial temperature profile is set up in the reaction tube. In a first reaction zone, the temperature is allowed to rise to a maximum of 240° C. as a result of the increase in heat generation concomitant with increase in conversion rate. A drop in reaction rate is observable from a fall in reaction temperature under constant cooling conditions. When the temperature has reached a level 5°to 20° C. below the maximum, the reaction is restarted, at the beginning of a second reaction zone, by the introduction of more initiator. This second reaction zone is characterized in that merely unconverted ethylene is polymerized, since virtually all of the comonomer(s) introduced have undergone copolymerization before further initiator is introduced. Appropriate cooling measures should be taken to ensure that the temperature in this second reaction zone does not exceed 300° C. on account of the considerable heat effect of the ethylene polymerization. The total residence time in the tubular reactor is usually between 40 and 120 seconds and is preferably in the range of from 60 to 90 seconds, the reaction mixture taking approximately twice as long to pass through the second reaction zone as through the first zone.

After the reaction mixture has been discharged, the copolymer is separated from unconverted ethylene by pressure release and the latter is advantageously recycled to the tubular reactor. In contrast to the process described in DE-A 1,952,693, only the unconsumed reaction gas is recycled, not the entire mixture.

Suitable comonomers are all $C_3$–$C_6$-alkenoic acids which copolymerize with ethylene under the conditions stated, for example acrylic, fumaric, methacrylic, itaconic, aconitic, maleic and citraconic acids, and their anhydrides. Mixtures of said acids may also be used. The alkenoic acids to be used in the present invention are added to the ethylene at the entry port of the reactor in concentrations of from 0.1 to 0.8% molar. This gives copolymers containing from 0.4 to 3.0% and preferably from 0.8 to 2.1% molar of copolymerized units of alkenoic acid.

Other suitable comonomers are all esters of said acids which have from 4 to 14 carbon atoms and which are copolymerizable with ethylene. It is preferred to use esters of acrylic acid with alcohols having up to 8 carbon atoms. The acrylates of methanol, ethanol, propanol and n-butanol and mixtures thereof are particularly suitable. They are added to the reaction mixture at the inlet of the reactor in concentrations of from 0.1 to 0.8% molar. In the resulting copolymers, the esters are present in concentrations ranging from 0.4 to 3.2% and preferably from 1.0 to 2.6% molar.

Polymerization is started by free-radical initiators which are conveniently added to the mixture at the reactor inlet in concentrations of from 0.5 to 10 molar ppm, based on ethylene and again at the beginning of the second reaction zone in concentrations of from 1 to 20 molar ppm, based on ethylene. Suitable initiators are peroxides, hydroperoxides or compounds containing azo groups, or mixtures of these substances.
Examples are:
t-butyl perpivalate, di-t-butyl peroxide, t-butyl hydroperoxide, t-butyl perbenzoate, dilauroyl peroxide, t-butyl per-iso-nonanoate, peroxybenzoic acid, di-2-ethylhexylperoxy dicarbonate, methylisobutylketone peroxide and azoduisobutyronitrile.

The molar mass of the resulting copolymer may be controlled by the addition of regulators in the usual manner. Examples of suitable regulators are low-boiling hydrocarbons, ketones or aldehydes and use is preferably made of propanal, propene or butene.

Copolymerization is generally carried out in the absence of solvent; the small amounts of solvent, such as toluene, isododecane or mineral oil, in which the initiators are dissolved may be neglected in comparison with the other substances.

The copolymers of the invention have a melt flow index of from 0.1 to 100 g/10min and preferably from 0.2 to 10 g/10min as measured according to DIN 53,735 at 190° C. and 2.16kg. Their mechanical properties satisfy all practical requirements, particularly as regards their possible use as adhesion promotors with respect to metals and plastics, as cable insulating materials or as starting materials for the manufacture of sheeting. The special f orm of the process of the invention provides copolymers which have higher puncture resistance and improved optical properties, particularly as regards light scatter index and luster.

Our process is also distinguished by a much simpler flow diagram for the substances used and by a decrease in the amount of equipment and control measures required, as it is no longer necessary to split the reaction mixture or meter exact amounts of comonomer to a number of inlet ports. Thus it is particularly suitable f or use in the simpler types of highpressure compressor plants which are not readily capable of splitting streams of substances.

EXAMPLE 2,300 kg/h of ethylene were metered, together with 27 kg/h of n-butyl acrylate (0.257% molar) and 13.7 kg/h of acrylic acid (0.231% molar), through a high-pressure compressor to a tubular reactor having a length of 400 meters and an 1/d ratio of 20,000:1, at 165° C. Copolymerization was initiated by the addition of 0.9 molar ppm of t-butyl per-iso-nonanoate, based on the ethylene, causing the temperature of the reaction mixture to rise to 230° C. Some of the heat generated during polymerization was removed by coolant flowing round the outside of the reactor, by which means the temperature rise inside the reactor tube could be restricted. After the mixture had cooled to 220° C. due to slowdown of the reaction, 3.7 molar ppm of methylisobutylketone peroxide were added to initiate homopolymerization of ethylene, whereupon the temperature in the tube rose to a maximum value of 300° C. There were thus obtained 486,87 kg/h of copolymer giving a conversion rate of 20.8%.

The copolymer contains 1.30% molar of copolymerized units of n-butyl acrylate and 0.97% molar of copolymerized units of acrylic acid. The melt flow index is 2.1 g/10 min, as measured at 190° C. and 2.16 kg (DIN 53,735). Other mechanical and optical properties and listed in the following Table. Sheeting prepared from this product shows excellent transparency.

Comparative Example

The experiment was repeated under identical conditions except that all of the peroxide was fed to the inlet port of the reactor. The Table shows that the copolymer prepared by the process of the invention has a higher puncture resistance and better optical properties. This is particularly evident from sheeting made from the copolymer which shows a low light-scattering effect and has a higher luster index.

TABLE

|  | Conversion (%) | Melt flow index (g/10 min)* | Puncture resistance (g)** | Light scatter (%)*** | Luster **** |
|---|---|---|---|---|---|
| Example | 20.8 | 2.1 | 250 | 79 | 46 |
| Comp. Ex. | 20.8 | 2.1 | 200 | 84 | 40 |

*Test DIN 53,735 at 190 ° C. and 2.16 kg
**Test ASTM 1,709
***Test DIN 53,490
****Test DIN 67,530 at an angle of 60°

We claim:
1. A process for the preparation of a copolymer of ethylene containing up to 4% molar of copolymerized units of a $C_3$–$C_6$-alkenoic acid or an ester thereof having up to 14 carbon atoms or a mixture of said monomers in a continuously operated tubular reactor at a pressure of from 500 to 5,000 bar and at elevated temperature in the presence of free-radical initiators which consists essentially of: passing a mixture of said reactants to the inlet port of the tubular reactor only, monitoring the temperature in a first reaction zone and restricting the temperature in said zone to a maximum of about 240° C. and, after the temperature has dropped by from 50 to 20° C. in said zone, metering further initiator to the beginning of a second reaction zone and completing the reaction at a temperature of up to 300° C.

2. A process as claimed in claim 1, wherein polymerization is carried out at a pressure of from 1,700 to 3,500 bar.

3. The process of claim 1, wherein further initiator is metered into the beginning of the second reaction zone after the temperature in the first reaction zone has dropped by about 10° C.

4. A process for the preparation of a copolymer of ethylene containing up to 4% molar of copolymerized units of a $C_3$–$C_6$-alkenoic acid or an ester thereof having up to 14 carbon atoms or a mixture of said monomers in a continuously operated tubular reactor at a pressure of from 500 to 5,000 bar and at elevated temperature in the presence of free-radical initiators which consists essentially of: passing a mixture of said reactants to the inlet port of the tubular reactor only, monitoring the temperature in a first reaction zone and restricting the temperature in said zone to a maximum of about 240° C. and, after the temperature has dropped by from 50 to 20° C. in said zone, metering further initiator and no ethylene and comonomer or comonomers to the beginning of a second reaction zone and completing the reaction at a temperature of up to 300° C.

* * * * *

UNITED STATES PATENT AND TRADEMARK OFFICE
CERTIFICATE OF CORRECTION

PATENT NO. : 6,245,864 B1  
DATED : June 12, 2001  
INVENTOR(S) : Hasenbein et al.

Page 1 of 1

It is certified that error appears in the above-identified patent and that said Letters Patent is hereby corrected as shown below:

Title page,  
The title should read -- COPOLYMER OF (A) ETHYLENE AND (B) AN ALKENOIC ACID OR A DERIVATIVE THEREOF OR A MIXTURE OF SAID MONOMERS --.

Column 4, claim 4,  
Line 52, "50 to 20 C" should be -- 5 to 20 C --.

Signed and Sealed this

Twelfth Day of March, 2002

Attest:

Attesting Officer

JAMES E. ROGAN  
Director of the United States Patent and Trademark Office